US006135250A

United States Patent [19]
Förster et al.

[11] Patent Number: 6,135,250
[45] Date of Patent: Oct. 24, 2000

[54] HYDROPNEUMATIC VIBRATION DAMPER OF VARIABLE DAMPING FORCE

[75] Inventors: Andreas Förster, Schweinfurt; Georg Memmel, Schwebheim, both of Germany

[73] Assignee: Mannesmann Sachs AG, Schweinfurt, Germany

[21] Appl. No.: 09/085,301

[22] Filed: May 27, 1998

[30]     Foreign Application Priority Data

Jun. 4, 1997 [DE] Germany ............... 197 23 348

[51] Int. Cl.⁷ ............................................. F16F 9/46
[52] U.S. Cl. ................... 188/266.5; 188/266.6; 188/322.2
[58] Field of Search ............ 188/266.5, 266.6, 188/282.6, 315, 316, 322.13, 322.15, 322.19, 322.2, 322.22

[56]     References Cited

U.S. PATENT DOCUMENTS

| | | | |
|---|---|---|---|
| 4,971,180 | 11/1990 | Kobayashi | 188/315 |
| 5,180,039 | 1/1993 | Axthammer et al. | 188/315 |
| 5,205,385 | 4/1993 | Ashiba | 188/266.5 |
| 5,386,893 | 2/1995 | Feigel | 188/266.5 |
| 5,392,885 | 2/1995 | Patzenhauere et al. | 188/266.6 |
| 5,472,070 | 12/1995 | Feigel | 188/266.8 |

FOREIGN PATENT DOCUMENTS

| | | |
|---|---|---|
| 0 517 875 B1 | 12/1992 | European Pat. Off. . |
| 3406875 A1 | 9/1985 | Germany . |
| 36 31 714 A1 | 4/1988 | Germany . |
| 88 15 444 | 3/1989 | Germany . |
| 3807913 C1 | 7/1989 | Germany . |
| 41 37 403 A1 | 5/1993 | Germany . |
| 42 37 666 A1 | 5/1994 | Germany . |
| 38 27 255 A1 | 2/1998 | Germany . |
| 2 159 234 | 11/1985 | United Kingdom . |

*Primary Examiner*—Chris Schwartz
*Attorney, Agent, or Firm*—Cohen, Pontani, Lieberman & Pavane

[57]     ABSTRACT

Disclosed is a hydropneumatic vibration damper of variable damping force, with a cylinder which is arranged between a piston rod guide and a bottom valve and in which a piston provided with at least one valve and connected to a piston rod subdivides the cylinder interior filled with damping fluid into a working space located on the piston rod side and a lower working space. A container surrounds the cylinder at a radial distance, thereby forming a compensating space which is filled with damping fluid and gas, while the lower working space can be connected hydraulically to the compensating space via a bottom valve and an electromagnetically actuable valve device is provided between the interior of the cylinder and the compensating space. The entire electromagnetically actuable valve device, taking effect between the interior of the cylinder, preferably the working space located on the piston rod side, and the compensating space, is arranged on that side of the bottom valve which is opposite the cylinder.

21 Claims, 4 Drawing Sheets

HYDROPNEUMATIC VIBRATION DAMPER OF VARIABLE DAMPING FORCE

BACKGROUND OF THE INVENTION

The invention relates to a hydropneumatic vibration damper of variable damping force having a cylinder and piston arrangement with an electromagnetically actuable valve.

DE 36 31 714 A1 discloses a hydropneumatic vibration damper of variable damping force, which has an electromagnetically adjustable bypass valve for the damping valve assigned to tensile damping and located in the piston and has a further electromagnetically adjustable bypass valve for the bottom valve taking effect in the event of compressive damping. Thus, although the electromagnet for the bypass valve assigned to the bottom valve is located underneath the bottom valve, the associated bypass duct nevertheless passes through the bottom valve body centrally and, moreover, a damping valve preceding the bypass valve projects into the lower working space of the vibration damper. In the case of such a design, the electromagnet located underneath the bottom valve can change only the damping force in the compressive stage, while a further electromagnetic adjusting device in the region of the piston is required in order to change the damping force in the tensile stage. Accordingly, because of the multiplicity of components which are necessary, such a vibration damper of variable damping force involves a high outlay in terms of construction and is costly to produce and assemble. Furthermore, such an arrangement of the bypass valves necessitates a relatively large construction space in the axial direction.

An electromagnet arranged between the container bottom and the bottom valve is also shown in DE 38 07 913 C1, the individual parts of the valve device and a tube receiving the valve armature being integral parts of the cylinder. Only the coil of the electromagnet is installed between the structural unit connected to the cylinder and a return pot, this return pot, seated positively and fixedly in terms of rotation in the container bottom, serving essentially for installing the coil of the electromagnet in the correct position.

In another vibration damper of variable damping force according to EP 0 517 875 B1, an electromagnetically variable damping valve assigned to compressive damping is arranged in the bottom valve, while the damping valve for tensile damping is seated in the piston and cooperates with a regulating mechanism having a central tube which passes centrally through the bottom valve and which is sealingly guided axially movably in a hollow piston rod. The design of a vibration damper of this type is highly complicated and costly, since each damping direction is assigned a separate damping valve and, moreover, the central tube has to be guided in the piston rod with great accuracy and sealed off.

The object of the present invention is to provide a hydropneumatic vibration damper of variable damping force, which has a simple design and can be produced cost-effectively, allows it to be set to the required damping forces without difficulty and occupies only a small amount of construction space.

SUMMARY OF THE INVENTION

This object is achieved by means of the invention, in that the entire electromagnetically actuable valve device, taking effect between the interior of the cylinder, preferably the working space located on the piston rod side, and the compensating space, is arranged on that side of the bottom valve which is opposite the cylinder. Since no structural parts projecting into a working space are required for the valve device, a simple and cost-effective design and easy assembly are ensured. One feature which contributes to this is that there is provided for receiving the electromagnetic valve device a valve housing, the interior of which is hydraulically connected to the interior of the cylinder, preferably to the working space located on the piston rod side, in the region of the piston rod guide, and to the compensating space.

In a further embodiment of the invention, the electromagnetic valve device consists of a permanently set damping valve and of an electromagnetically adjustable valve, thereby achieving, according to the invention, a very simple overall design, in that the flow passes through the electromagnetic valve device in one direction of flow for tensile damping and compressive damping.

To set the valve device to the required damping values, it is advantageous if the permanently set damping valve and the electromagnetically adjustable valve can be set and tested separately and/or in combination, while particularly simple installation becomes possible in that the electromagnetic valve device consisting of the permanently set damping valve and of the electromagnetically adjustable valve forms a structural unit.

In a further advantageous embodiment of the invention, a very simple overall design of the vibration damper is achieved by providing the valve housing with centering faces for centering the inner container tube, the container and the bottom valve or, if appropriate, the cylinder. The structural parts connected to the valve housing can thus be connected to and axially braced with the valve housing without difficulty.

Also as regards the functioning of the vibration damper, only one damping valve device is required for tensile damping and compressive damping, the piston possessing only one simple nonreturn valve which opens into the cylinder during the retracting movement of the piston rod, while, according to one feature, the bottom valve has a nonreturn valve, opening to the compensating space during the extending movement of the piston rod, and preferably a pressure relief valve which opens toward the compensating space when the maximum permissible internal pressure in the cylinder is exceeded.

A wide variety of valve housings is permitted for installation in the container and/or for mounting a bottom cap or a container bottom which may be provided, for example, with a connecting lug serving for fastening the vibration damper in the vehicle. Thus, in one embodiment, the valve housing is provided, for fastening the bottom cap or for fixing in the container, with an annular groove, into which the bottom cap or the wall of the container engages, while, in a further version, the valve housing is provided with a portion of smaller diameter which forms a bearing face for the container, said bearing face taking effect in the axial direction. Furthermore, a connection of the electromagnetic valve to the container or to the valve housing is produced in a simple way by providing the electromagnetic valve with an annular groove, in which an open and radially resilient wire ring is arranged, said wire ring engaging into a corresponding annular container groove or into an annular groove of the valve housing. Such a connection may be designed to be demountable or undemountable, depending on whether the wire ends can be gripped by a tool or not.

A particularly advantageous embodiment of the invention is obtained by arranging the axis of the electromagnetically actuable valve device so as to run essentially perpendicularly to the axis of the vibration damper. This arrangement allows the valve device to be mounted and removed very simply, and the valve device assembled to form a structural unit can be installed in the valve housing in one operation. In this embodiment, it is easily possible for the bottom valve to be designed in one piece with the valve housing. This valve device axis running transversely relative to the axis of the vibration damper makes it possible to have a highly compact design of the valve housing which not only serves for centering and axially bracing the cylindrical stationary vibration damper parts, but is provided in one piece with a connecting joint preferably designed as a connecting lug, thus resulting in a version which takes up an extremely small amount of construction space in the axial direction and radial direction, particularly, when the axis of the electromagnetically actuable valve device is arranged approximately transversely to the axis of the connecting lug.

The various features of novelty which characterize the invention are pointed out with particularity in the claims appended to and forming a part of this specification. For a better understanding of the invention, its operating advantages and specific objects obtained by its use, reference should be had to the accompanying drawings and descriptive matter in which there is illustrated and described a preferred embodiment of the invention.

DESCRIPTION OF THE PREFERRED EMBODIMENT

The design and operating mode of a hydropneumatic vibration damper of the double-tube type may be presumed to be known, and therefore only the essential differences between the subject of the invention and the conventional double-tube vibration dampers are described below.

Figure 1:
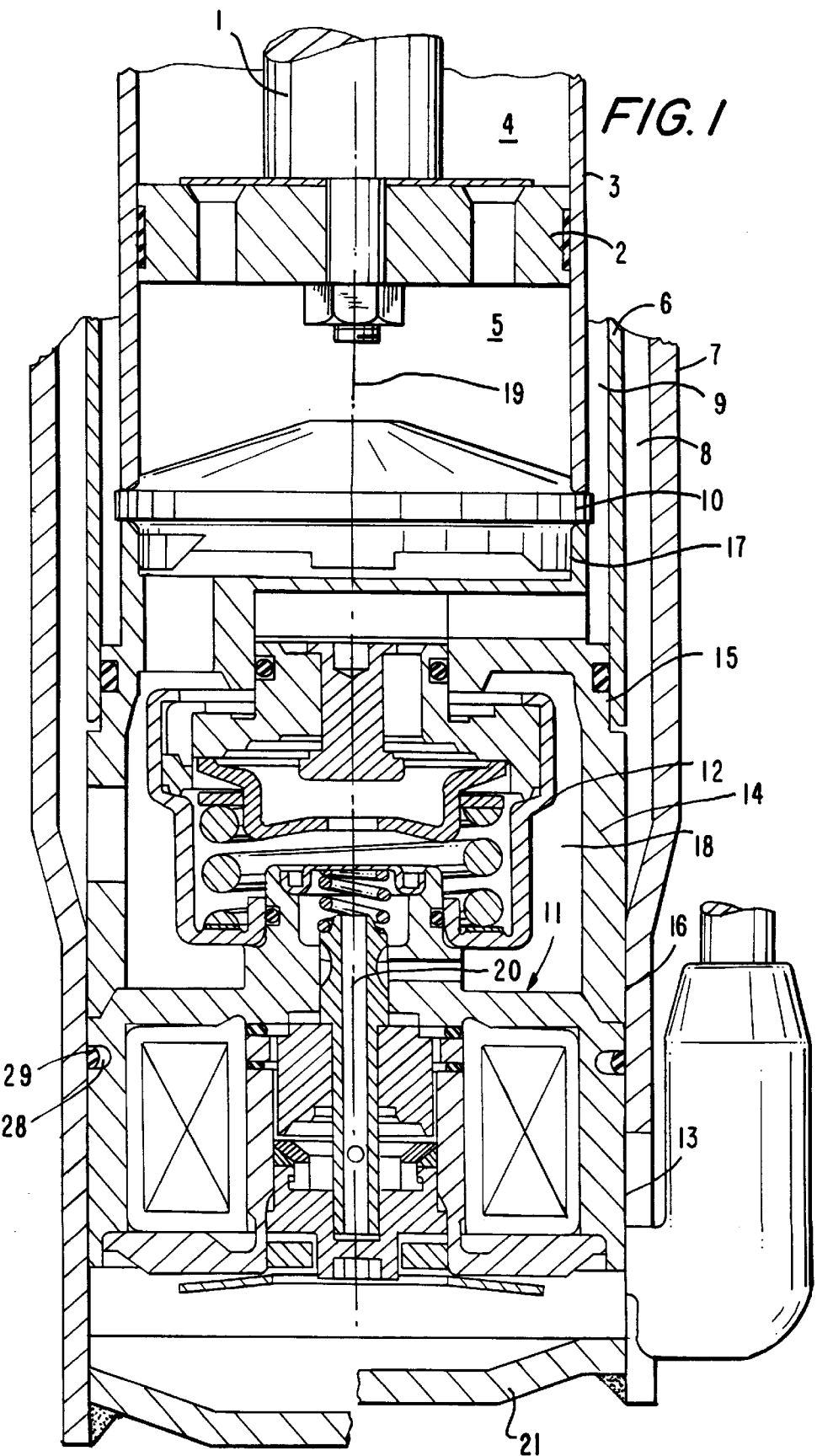
FIG. 1 shows a vibration damper in the region of the valve device in longitudinal section.

Referring to FIG. 1, the vibration damper has a piston 2 which is connected to a piston rod 1 and which is provided with a nonreturn valve, the nonreturn valve opening into the cylinder 3 during the retracting movement of the piston rod 1. The interior of the cylinder 3 is filled with a damping fluid and is subdivided by the piston 2 into two working spaces, a working space 4 located on the piston rod side and a lower working space 5. The working space 4 is delimited at the end of the cylinder 3 by a piston rod guide (not shown) while a bottom valve 10 as a termination of the working space 5 is arranged at the other end of the cylinder 3. This bottom valve 10 carries a nonreturn valve which, during the extending movement of the piston rod 1, connects the working space 5 hydraulically to a compensating space 8 filled with damping fluid and gas. The compensating space 8 is located between the outer wall of the inner container tube 6 and the inner wall of the container 7. A further hydraulic connection 9 is made by means of an annular space between the cylinder 3 and an inner container tube 6, this hydraulic connection 9 connecting the working space 4 to an electromagnetically actuable valve device 11 in a fluid-conducting manner via passage orifices located in the region of the piston rod guide. Valve device 11 is axially delimited by the bottom valve 10 on the one hand and by a container bottom 21 on the other hand, and is arranged at least partially in a valve housing 14 and consists of a permanently set damping valve 12 and of an electromagnetically adjustable valve 13.

Such an overall design of the valve device 11 leads to a short and space-saving form of construction of the vibration damper, and its overall design can be kept simple, since the valve device 11, in addition to ensuring damping force adjustability, also performs the function of the piston and bottom damping valves which are otherwise customary in double-tube vibration dampers. In this case, it is advantageous for the valve housing 14 to have a receptacle for the valve device 11, the receptacle opening into the hydraulic connection 9, and having a further passage between the bottom valve 10 and the compensating space 8. Furthermore, the valve housing 14 serves for making assembly easier, since it is provided with a centering face 15 for the inner container tube 6, with a centering face 16 for the container 7 and with a centering face 17 for the bottom valve 10. Consequently, the structural parts are assembled together with the valve device 11 and, as shown on the right-hand side of FIG. 1, installed so as to be axially braced against the container bottom welded into the container 7.

A further fastening variant is shown on the left-hand side of FIG. 1. In this case, the electromagnetically adjustable valve 13 is provided with an annular groove 28, into which is inserted an open and radially resilient wire ring 29 which, during assembly, engages into a corresponding annular container groove. A fastening of this type may be designed in a very simple way so as to be releasable or unreleasable. For example, for releasable connection, the wire ring 29 is provided with axially bent ends which are pressed together by means of a tool in order to release the connection.

The valve device 11, consisting of the permanently set damping valve 12 and of the electromagnetically adjustable valve 13, is combined to form a structural unit, and the valves 12 and 13 may be individually set and tested before being installed in the vibration damper or else this may be carried out after the valve device 11 has been assembled. In this embodiment, the axis 20 of the valve device 11 runs in the direction of the axis 19 of the vibration damper.

The operating mode of the valve device 11 is also very simple, since the flow passes through the latter in the same direction of flow in the tension and compression directions of the piston rod 1. In the tension direction of the piston rod 1, the nonreturn valve in the piston 2 closes the hydraulic connection between the working space 4 located on the piston rod side and the lower working space 5, with the result that the damping fluid located in the annular space between the cylinder 3 and the piston rod 1 is led, via ducts not shown, located in the region of the piston rod guide, by way of the hydraulic connection 9 to the valve housing 14 and from there, via radial orifices, to the permanently set damping valve 12 of the valve device 11. During this tensile damping, the pressure in the lower working space 5 decreases in relation to the compensating space 8, so that the nonreturn valve of the bottom valve 10 opens and damping fluid passes out of the compensating space 8 via the radial orifice in the valve housing 14, its interior 18 and axial bores to the bottom valve 10.

For compressive damping, that is to say during the retraction of the piston rod 1 into the cylinder 3, the nonreturn valve in the bottom valve 10 is kept closed due to the pressure increase, while the nonreturn valve in the piston 2 opens and a damping fluid volume corresponding to the piston rod volume penetrating into the cylinder is forced through the valve device 11 via the hydraulic connection 9 and the corresponding ducts in the valve housing 14 and flows into the compensating space 8.

The change in the damping effect of the valve device 11 both for the tension direction and for the compression direction takes place via the electromagnetically adjustable valve 13 which is connected electrically to a control or regulating device, the adjustment commands of which then lead to the desired damping force effect.

Figure 2:
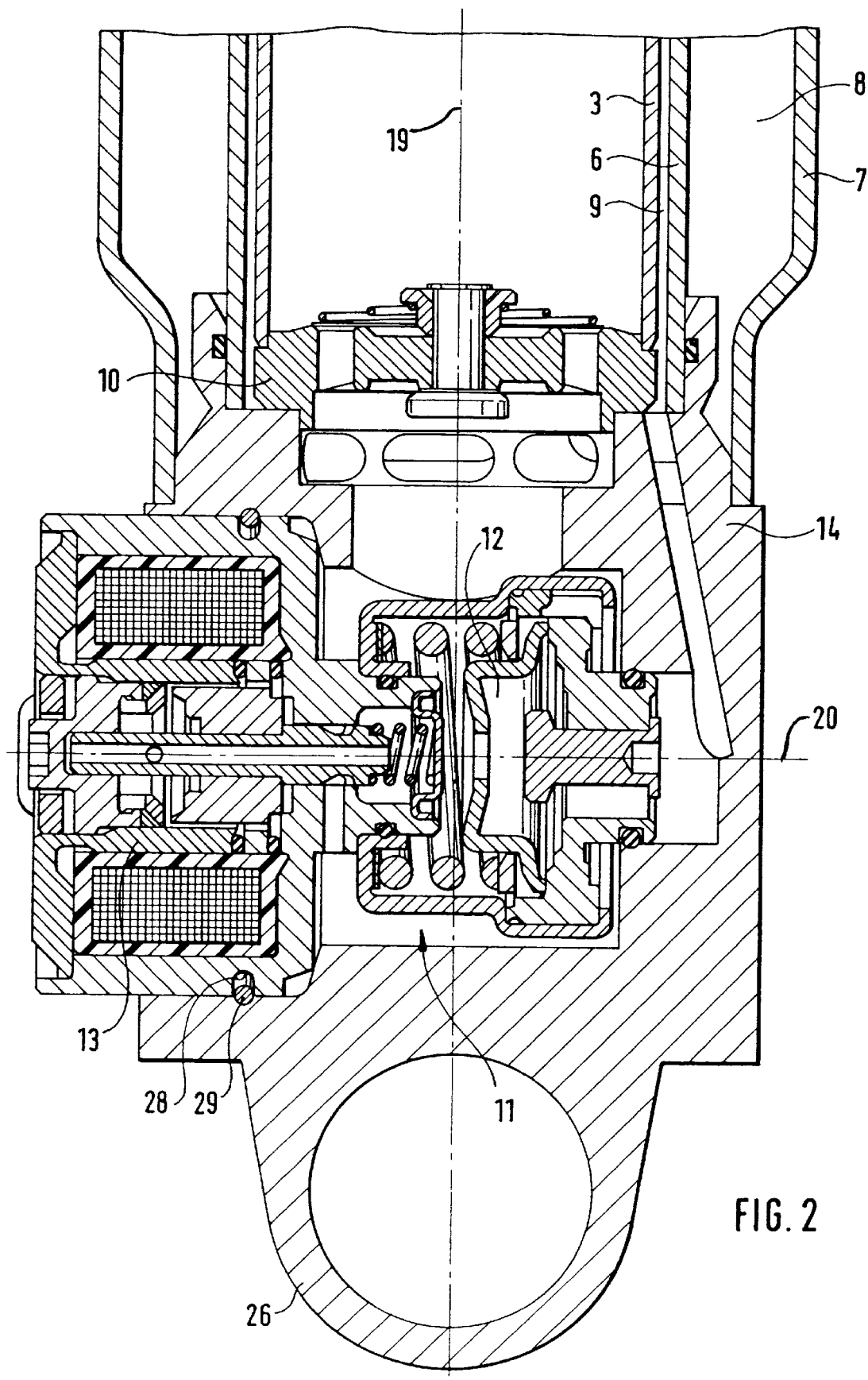
FIG. 2 shows, in longitudinal section, a preferred embodiment in which the axis of the valve device runs approximately perpendicularly to the vibration damper axis.

FIG. 2 shows an advantageous and extremely short-designed embodiment of a vibration damper of variable damping force, since the axis 20 of the valve device 11 is arranged essentially perpendicularly to the axis 19 of the vibration damper. The valve device 14 is also designed correspondingly, having a receptacle for the bottom valve 10 provided with the nonreturn valve, the receptacle running in the axial direction of the vibration damper. Radially extending orifices which open into the compensating space 8 delimited by the inner container tube 6 and by the container 7 are provided in the region of this receptacle. The hydraulic connection 9 leads, in the valve housing 14, to the inlet for the permanently set damping valve 12 which, together with the electromagnetically adjustable valve 13, forms the valve device 11. It is particularly simple to mount the valve device 11, which is installed in the valve housing 14 approximately perpendicularly to the axis 19 of the vibration damper and preferably transversely or approximately transversely to the axis of a connecting lug 26, since, after the remaining structural parts of the vibration damper have been assembled, the entire valve unit 11 can be pushed into the valve housing 14 and fastened. Thus, by virtue of this design, it is not only possible to have a very small construction space in the direction of the axis 19 of the vibration damper, but also to have considerable independence in the assembly sequence for installing the valve device 11 in the vibration damper, so that existing assembly lines can be used without any appreciable rearrangement. Another advantage of this embodiment is that the valve housing 14 is designed in one piece with a connecting joint 26 designed as a connecting lug and is connected fixedly to the container 7, the inner container 6 and, via the bottom valve 10, to the cylinder 3. The valve device 11 is fastened in the valve housing 14 preferably by means of an open and radially resilient wire ring 29 which is arranged in the annular groove 28 of the electromagnetic valve 13 and which, when the valve device 11 is pushed into the valve housing 14, snaps into a corresponding annular groove of the valve housing 14. As already described, this connection, too, may be designed releasably or unreleasably. The functioning of the valve device 11 and of its change in the damping force corresponds to the operating mode already described with regard to the embodiment according to FIG. 1.

Figure 3:
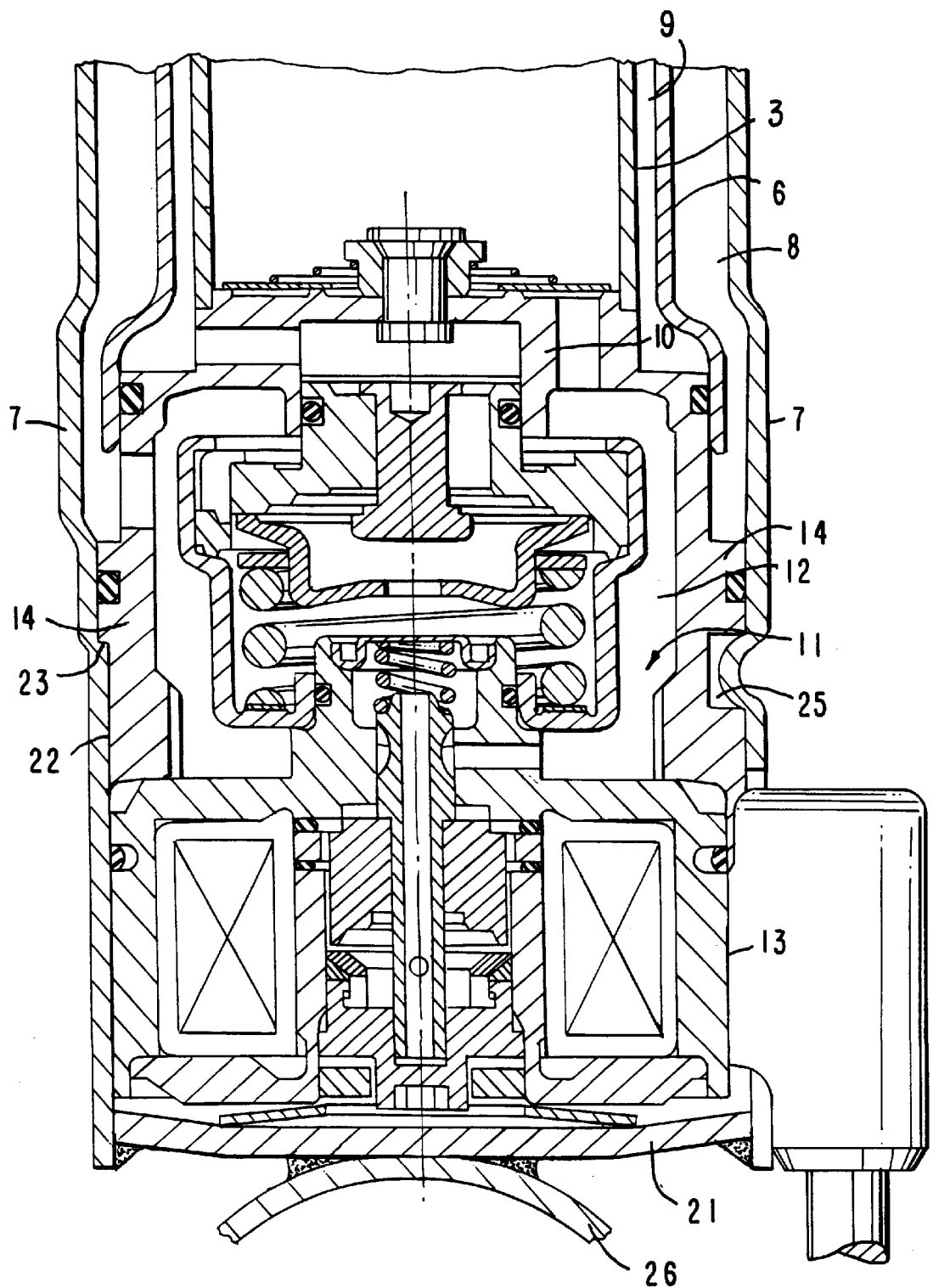
FIG. 3 shows a valve which is combined with the bottom valve to form a structural unit.

The embodiment according to FIG. 3 differs from that according to FIG. 1 essentially in that the valve housing 14 is designed in one piece with the bottom valve 10. As illustrated in the left half of the drawing, the cylindrical structural parts are axially supported and prestressed in the container 7 via a bearing face 23, by means of which the valve housing 14 is supported on a corresponding counter-face of the container, while a portion of smaller diameter 22 bears, for exact guidance, on the indrawn inner wall of the container 7.

In the right half of FIG. 3, the valve housing 14 is provided, for fastening in the container 7, with an annular groove 25, into which the container 7 engages by deformation and forms an externally visible bead. For both types of fastening shown in FIG. 3, the axial force of the prestress is transmitted from the valve housing 14 to the container 7, while a perfect installation position of the valve device 11 is ensured by a spring element which is installed between the container bottom, provided with the connecting joint or with the connecting lug, and the electromagnetically adjustable valve 13.

Figure 4:
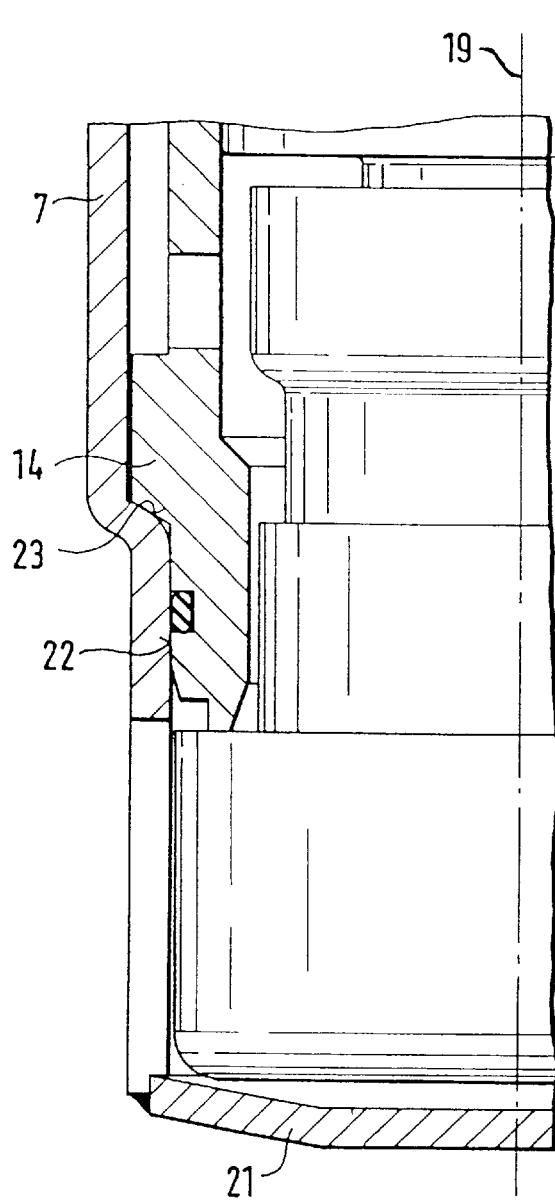
FIG. 4 shows a type of fastening of the valve housing in the container.
Figure 5:
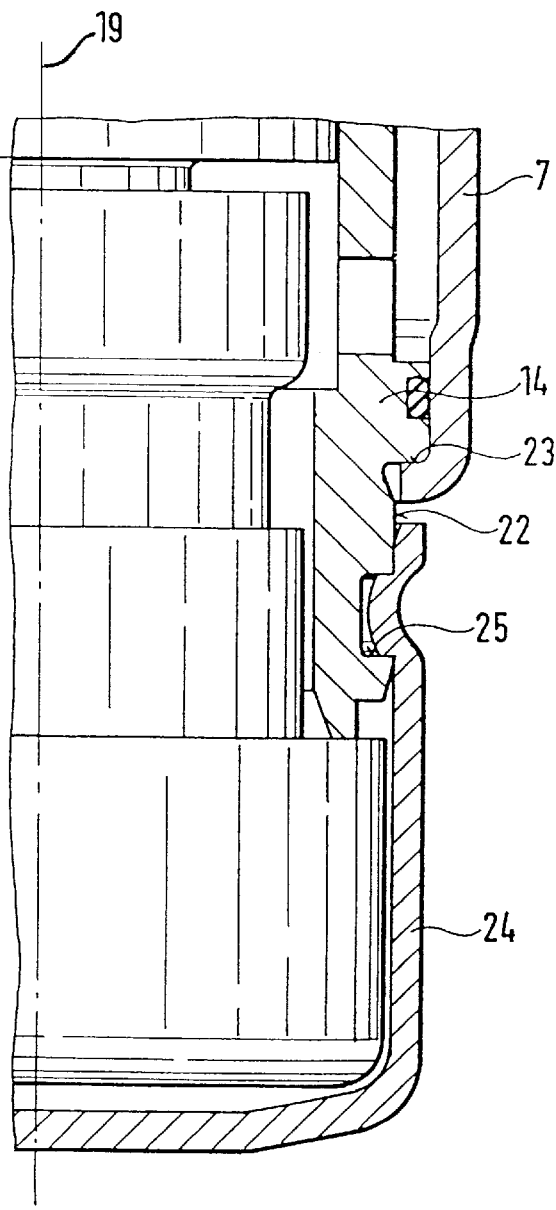
FIG. 5 shows a connection of a bottom cap to the valve housing.

The fastening of the valve housing 14 by means of the bearing face 23 is illustrated, enlarged, in FIG. 4. A sealing ring is arranged in a sealing ring groove in a portion of smaller diameter 22 for sealing off relative to the inner wall of the container 7. The container bottom 21 is welded into the container 7 and may be connected to a connecting joint. A connection of the valve housing 14 to a bottom cap 24 is shown in FIG. 5. For this purpose, the valve housing 14 is provided, on the portion of smaller diameter 22, with an annular groove 25, into which the cap 24 engages, preferably as a result of a crimping operation, thus making the fixed connection to the valve housing 14. The bearing face 23, on which the flanged end of the cylinder 7 rests, is provided for fastening the valve housing 14 in the container 7.

In all the embodiments illustrated, it is readily possible to arrange and set a pressure relief valve in the bottom valve 10, in such a way that said relief valve opens toward the compensating space 8 when a predetermined maximum pressure in the cylinder 3 is exceeded.

The terms and expressions which have been employed are used as terms of description and not of limitation, and there is no intention in the use of such terms and expressions of excluding any equivalent of the features shown and described or portions thereof, it being recognized that various modifications are possible within the scope of the invention.

What is claimed is:

1. A hydropneumatic vibration damper of variable damping force comprising:
   a piston rod guide;
   a bottom valve;
   a cylinder having an interior and a bottom said cylinder extending at least between said piston rod guide and said bottom valve and having a piston and a valve therein, said piston defining a first work space located on the piston rod side of the piston and a second working space, said cylinder interior space being filled with damping fluid;
   a container surrounding said cylinder at a radial distance therefrom forming a compensating space therebetween, said compensating space being filled with a damping fluid and gas and being in fluid communication with said second working space via said bottom valve;
   an electromagnetically actuable valve device, said device controlling a hydraulic connection between the interior of the cylinder and the compensating space, said electromagnetically actuable valve being arranged on a side of the bottom valve which is opposite the cylinder.

2. The vibration damper of claim 1 further comprising a valve housing having an interior which is connected hydraulically to the interior of the cylinder and to the compensating space, said electromagnetic valve being positioned in said valve housing.

3. The vibration damper of claim 1 wherein the electromagnetically actuable valve consists of a permanently set damping valve and of an electromagnetically adjustable valve.

4. The vibration damper of claim 1 wherein the fluid flow passes through the electromagnetic valve in one direction of flow for tensile damping and compressive damping.

5. The vibration damper of claim 3 wherein the electromagnetic valve device consisting of the permanently set damping valve and of the electromagnetically adjustable valve forms a structural unit.

6. The vibration damper of claim 1 wherein the valve housing has a plurality of centering faces for centering the inner container tube, the container and the bottom valve and, optionally, the cylinder.

7. The vibration damper of claim 1 wherein the piston has a nonreturn valve which opens into the cylinder during the retracting movement of the piston rod and the entire damping effect takes place by means of the electromagnetically actuable valve device.

8. The vibration damper of claim 1 wherein the bottom valve has a nonreturn valve opening toward the compensating space during the extending movement of the piston rod, and a pressure relief valve, the pressure relief valve opening toward the compensating space when the maximum permissible internal pressure in the cylinder is exceeded.

9. The vibration damper of claim 1 wherein the valve housing has, for fastening a bottom cap or for fixing in the container, an annular groove into which the bottom cap or the wall of the container engages.

10. The vibration damper of claim 1 wherein the valve housing has at a lower end thereof a portion of smaller diameter which forms a bearing face for the container, said bearing face taking effect in the axial direction.

11. The vibration damper of claim 1 wherein the electromagnetic valve has an annular groove and arranged therein is an open and radially resilient wire ring which engages into a corresponding annular container groove or an annular groove of the valve housing, thereby making it possible to have an undemountable or demountable connection.

12. The vibration damper of claim 1 wherein at least one of the valve housing and the electromagnetic valve is supported via the container bottom.

13. The vibration damper of claim 1 wherein the electromagnetically actuable valve device has an axis which is arranged so as to run essentially perpendicularly to the axis of the vibration damper.

14. The vibration damper of claim 1 wherein the bottom valve is one piece with the valve housing.

15. The vibration damper of claim 1 wherein the valve device, combined to form a structural unit, is adapted to be installed in the valve housing in one operation.

16. The vibration damper of claim 1 wherein the valve housing has a connecting joint serving for fastening the vibration damper in a vehicle.

17. The vibration damper of claim 1 wherein the axis of the electromagnetically actuable valve device is arranged preferably transversely to the axis of a connecting lug forming the connecting joint.

18. The hydropneumatic vibration damper of claim 2 wherein the valve housing interior is hydraulically connected to the working space located on the piston rod side.

19. The hydropneumatic vibration damper of claim 1 wherein the electromagnetically actuable valve device controls a hydraulic connection between the first working space of the cylinder interior and the compensating space.

20. A hydropneumatic vibration damper of variable damping force comprising:

a piston rod guide;

a bottom valve;

a cylinder having an interior and a bottom said cylinder extending at least between said piston rod guide and said bottom valve and having a piston and a valve therein, said piston defining a first work space located on the piston rod side of the piston and a second working space, said cylinder interior space being filled with damping fluid;

a container surrounding said cylinder at a radial distance therefrom forming a compensating space therebetween, said compensating space being filled with a damping fluid and gas and being in fluid communication with said second working space via said bottom valve;

a valve housing having a plurality of centering faces for centering the inner container tube, the container and the bottom valve and, optionally, the cylinder; and an electromagnetically actuable valve device located in said valve housing, said valve device controlling a hydraulic connection between the interior of the cylinder and the compensating space, said electromagnetically actuable valve being arranged on a side of the bottom valve which is opposite the cylinder.

21. The hydropneumatic vibration damper of claim 20 wherein the electromagnetically actuable valve device controls a hydraulic connection between the first working space of the cylinder interior and the compensating space.

* * * * *